US006993600B1

(12) United States Patent
Vo et al.

(10) Patent No.: US 6,993,600 B1
(45) Date of Patent: Jan. 31, 2006

(54) WRITE CONTROL SEQUENCER FOR OPTICAL READ/WRITE AND DVD COMBINATION INTEGRATED CIRCUIT

(75) Inventors: Dam Thanh Vo, Fremont, CA (US); Christopher Dinh, San Jose, CA (US); Pengwei Liu, San Jose, CA (US)

(73) Assignee: Integrated Memory Logic, Inc., Campbell, CA (US)

( * ) Notice: Subject to any disclaimer, the term of this patent is extended or adjusted under 35 U.S.C. 154(b) by 1 day.

(21) Appl. No.: 10/431,997

(22) Filed: May 7, 2003

(51) Int. Cl.
*G06F 3/00* (2006.01)
*G11C 7/00* (2006.01)
(52) U.S. Cl. .................. 710/33; 710/8; 710/9; 710/10; 365/200; 369/30.11; 369/44.27
(58) Field of Classification Search .............. 710/8–10, 710/33; 365/200, 30.11, 44.27
See application file for complete search history.

(56) References Cited

U.S. PATENT DOCUMENTS

2002/0075735 A1 * 6/2002 Kibashi et al. ............. 365/200

* cited by examiner

*Primary Examiner*—Tammara Peyton
(74) *Attorney, Agent, or Firm*—Sidley Austin Brown & Wood LLP

(57) ABSTRACT

A controller for a writable optical media is presented. The controller includes a write control sequencer that monitors the transmission of data from a host device to the writable optical media without continuous supervision from a microcomputer. The write control sequencer monitors and controls data flow in response to descriptors which are loaded into the controller prior to the transfer by a microprocessor.

19 Claims, 12 Drawing Sheets

FIG. 2D

| Offset | Field | Size |
|---|---|---|
| 0 | Sync | |
| 11 | Header: Min. / Sec. / Frame / Mode = 02 | |
| 15 | Subheader 1: File # / Chann # / Submode / Coding Int. | |
| | Subheader 2: File # / Chan # / Submode / Coding Int. | |
| 23 | User Data | 2048 Bytes |
| 2071 | EDC | 4 Bytes |
| 2075 | P-Parity | 172 Bytes |
| 2247 | Q-Parity | 104 Bytes |
| 2351 | | |

FIG. 2E

| Offset | Field | Size |
|---|---|---|
| 0 | Sync | |
| 11 | Header: Min. / Sec. / Frame / Mode = 02 | |
| 15 | Subheader 1: File # / Chann # / Submode / Coding Int. | |
| | Subheader 2: File # / Chan # / Submode / Coding Int. | |
| 23 | User Data | |
| 2347 | EDC | 4 Bytes |
| 2351 | | |

WRITE CONTROL SEQUENCER FOR OPTICAL READ/WRITE AND DVD COMBINATION INTEGRATED CIRCUIT

CROSS-REFERENCE TO CD-ROM APPENDIX

CD ROM Appendix A is a CD-ROM appendix containing firmware code to be executed by a microprocessor in accordance with the present invention and Verilog code for production of a controller chip according to the present invention. CD ROM Appendix A is a computer program listing appendix having 18 files. Appendix A is submitted in two (2) identical copies of CD in IBM PC/XT/AT format and is MS-DOS compatible. A listing of files is included here as Appendix B. CD-ROM Appendix A and Appendix B are herein incorporated by reference in their entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates to writable CD and DVD controllers and, in particular, writable CD and DVD controllers for high data-rate writes.

2. Discussion of Related Art

As writable CD and DVD data storage devices become more generally available, the ability to write data to them at high data transmission rates becomes more important. In general, data transmitted from a host device, for example a computer system, is encoded and written onto the optical medium (e.g., writable CD and DVD devices). Data encoding typically involves fetching data from the host device over, for example, an ATAPI protocol bus, and preparing the data for physically writing onto the optical media.

Typically, a controller will include a microcomputer that runs firmware that monitors and controls the various tasks of receiving data from the host device and encoding the data for physically writing to the optical medium. At low transmission rates, and hence low encoding rates, the monitoring and controlling tasks can be easily handled by most microcomputers utilized for the task.

However, at high transmission rates, for example about 48× or higher, the processor speeds are not fast enough for many microcomputers, especially ones that would be typically utilized in CD or DVD controllers, to handle the tasks of monitoring and controlling the data flow as required. Additionally, repetitive firmware tasks can require large firmware codes, and comparatively large amounts of ROM for storing the large firmware codes.

Therefore, there is a need for controllers for writable optical drives that provide for high data transmission rates between the host device and the optical medium. Further, there is a need for controllers that do not require large amounts of ROM for storage of large firmware codes.

SUMMARY

In accordance with the present invention, a controller for a writable optical media is presented. The controller includes a write control sequencer that directs the transmission of data from a host device to the writable optical media without continuous supervision from a microcomputer. Additionally, in some embodiments the controller reuses pre-formatted data stored with the controller to write to optical media without fetching the data from the host. In some embodiments, the pre-formatted data can be stored in a memory external to the controller.

A write control sequencer according to the present invention is implemented in hardware and, in some embodiments, can be programmably controlled by the microcomputer in response to the firmware. Encoding with the write control sequencer, therefore, can be accomplished at much higher data transmission rates since the encoding is monitored and controlled by the write control sequencer rather than the microcomputer. Further, the amount of firmware code is reduced, requiring only the codes to program the write control sequencer rather than all of the code to monitor and control the entire data transfer process. The reduced amount of firmware code will require less ROM storage than the amount of firmware code needed to monitor and control the entire data transmission process.

In some embodiments of the invention, a controller according to the present invention includes a host interface coupled to communicate with a host; a memory controller coupled to communicate with an external memory; a disk drive interface coupled to communicate with an optical disk drive; a data encoder that encodes user data and subcode data for writing onto a media in the optical disk drive; and a write control sequencer coupled to control and monitor data flow between the host interface and the disk drive interface. A microprocessor constructs and stores WCS descriptors corresponding to instructions regarding the processing of user data to be written and the write control sequencer monitors and controls the flow of data in accordance with the instructions included in the WCS descriptors. In some embodiments, the WCS descriptors includes data and subcode descriptor pairs.

These and other embodiments are further discussed below with respect to the following figures.

BRIEF DESCRIPTION OF THE FIGURES

FIGS. 2A through 2E illustrate typical sector formats for data written onto an optical media.

In the figures, components having the same designation have the same or similar functions.

DETAILED DESCRIPTION OF THE FIGURES

Figure 1:
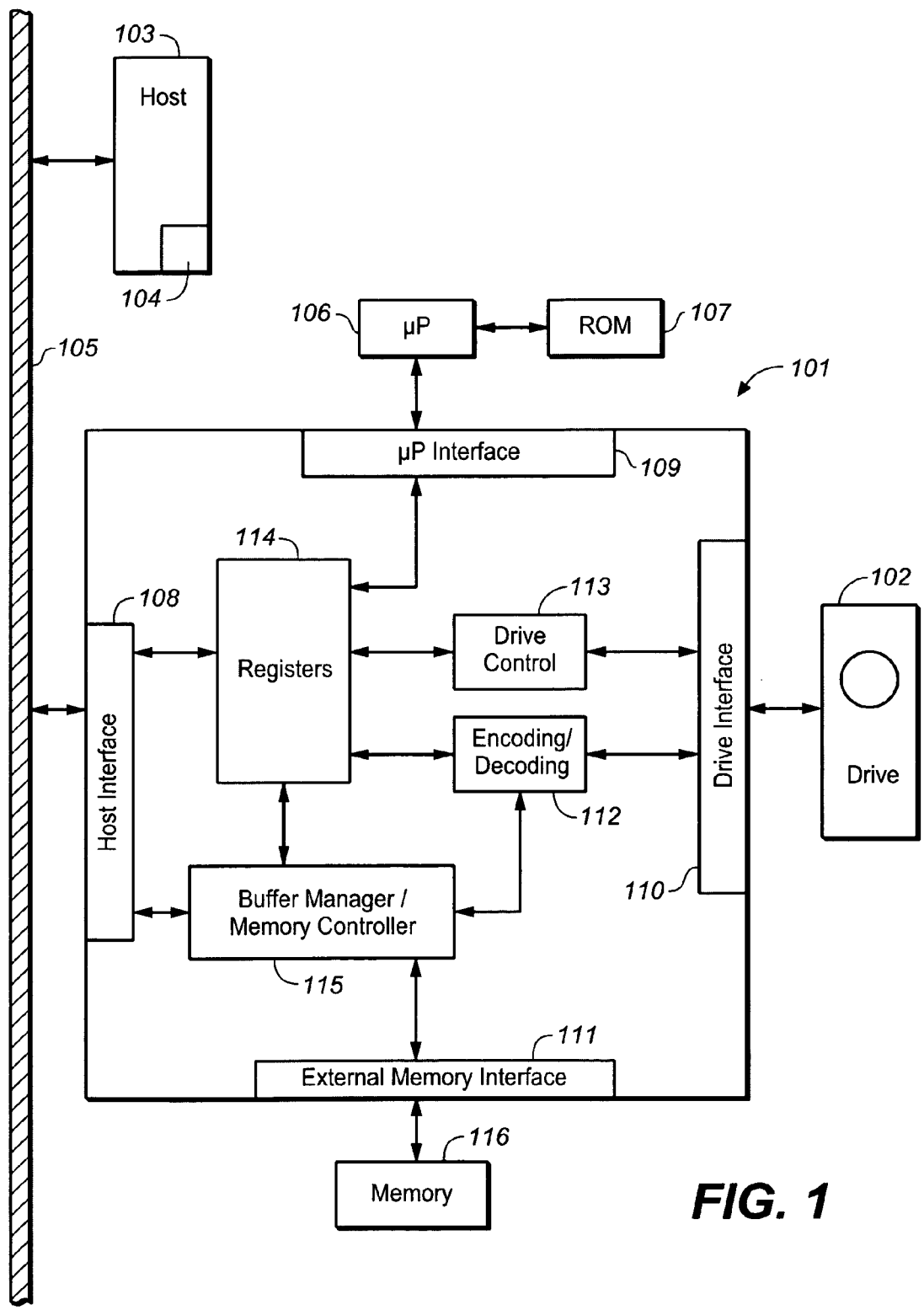
FIG. 1 shows a block diagram illustrating the write circuits of a conventional controller.

FIG. 1 shows a block diagram of the write circuitry for a controller 101 for drive 102. Drive 102 can be an optical CD R/W drive or a writable DVD drive. Controller 101 controls the flow of data between a host device 103 and drive 102. In many instances, host device 103 includes a storage device 104 for storing data to be transferred to optical drive 102. Storage device 104 may, for example, be another optical disk drive, a magnetic hard drive, a floppy drive, or a tape drive.

Controller 101 can be coupled to host 103 through bus 105. Bus 105 may be any type of bus for carrying data between host 103 and controller 101, for example, an ATAPI bus, PC/I bus, SCSI bus, IEEE1394 bus or any other bus for coupling host 103 with controller 101. An ATAPI standard bus is typically the standard bus for CD/DVD interfaces. Controller 101 includes a host interface 108 for communicating with host 103 through bus 105. Further, a microprocessor interface 109 interfaces controller 101 with an external microprocessor 106. A drive interface 110 interfaces controller 101 with optical drive 102. Additionally, an external memory interface 111 interfaces controller 101 with external memory 116. External memory 116 can be any RAM memory, for example SDRAM, DRAM, EDDRAM.

Microprocessor 106 can be any microprocessor, for example, an Advanced RISC machine (ARM), an Intel 8051, a Hitachi H8, or a Motorola 6800. Microprocessor 106 can be of any bit size, for example 8, 16 or 32 bit machines. Microprocessor 106 executes firmware instructions stored in ROM 107.

Microprocessor 106, through microprocessor interface 109, controls and monitors the operation of controller 101 through registers 114. Registers 114 include registers for controlling the servo systems (e.g., tracking and focus) through drive control 113 and the flow of data between host 103 and drive 102 through buffer manager and memory controller 115 and encoding/decoding block 112. Encoding and Decoding block 112 can include what is commonly referred to as C1/C2 error correction and concealment as well as C3 error correction code. However, as discussed above, in most cases microprocessor 106 may be unable to monitor and control data flow between host 103 and optical drive 102 for high speed data writes.

In a write operation, after host 103 signals to microprocessor 106 through host interface 108 and registers 114 that a write to drive 102 is requested, microprocessor 106 initializes registers 114. Registers 114 may, for example, include registers that store the number of blocks of data that are to be transferred, the number of blocks of data currently stored in memory 116, the format of data being transferred (e.g., digital data, multi-media data, audio data, or other format), and other parameters. Once the individual registers of registers 114 have been initialized, microprocessor 106 indicates, through registers 114, that controller 101 is ready to receive a certain number of blocks of data from host 103. As blocks of data are received into controller 101 by host interface 108, each block of data is stored in memory 116 by buffer manager/memory controller 115 and a counter register in registers 114 is incremented. Once a certain number of blocks of data has been received in memory 116, microprocessor 106 signals that encoding/decoding 112 should begin encoding data for transfer to drive 102. Encoding/decoding 112, under the direction and control of microprocessor 106, starts to receive data written into buffers from memory 116 by buffer manager/memory controller 115. As data is encoded, it is written to drive 102 through drive interface 110.

FIGS. 2A through 2E show some typical sector formats that can be encoded by embodiments of controller 101 or by controllers according to embodiments of the present invention. A sector of data typically includes a sync, a sector header, user data, and error codes (e.g., EDC and ECC). Typically, the sync and header fields are about 12 bytes long. The user data field will depend on the number of blocks in the sector and will typically be the number of blocks times 2560 bytes. EDC and ECC codes are typically four (4) bytes in length.

The sector formats shown in FIGS. 2A through 2E are compatible with the "Yellow Book", Standard ECMA-130, "Data Interchange on Read-Only 120 mm optical data disks (CD-ROM), June 1996 (International Standard ISO/IEC 10149), which is herein incorporated by reference in its entirety.

As shown in FIGS. 2A through 2E illustrating aspects of the ECMA-130 standard, each sector is 2352 bytes long and starts with a sync field and a header field. The sync field is 12 bytes long and occupies bytes 0 through 11. Typically, in the first byte and the $11^{th}$ byte, hexadecimal 00 is recorded while in bytes 2 through 10, hexadecimal FF is recorded. The header field is a four-byte field occupying bytes 12 through 15. Bytes 12–14 contain the sector address, usually in units of MIN, SEC and FRAME, indicating the physical address of the sector expressed in terms of the relative time elapsed since the beginning of a lead-in area. Sector addresses may also be included in areas of the user data where the physical sector address, usually in units of A-MIN, A-SEC, and A-FRAME, indicate the physical address expressed in absolute time elapsed since the beginning of the user area. Byte 15, the fourth byte of the header, indicates the sector mode.

Figure 2A:
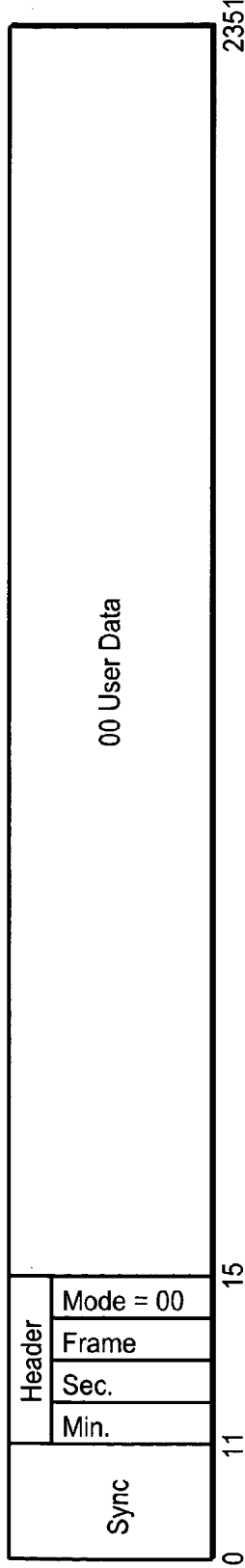

FIG. 2A shows a format for sector mode 00, where all of the user data in bytes 16 through 2351 are set to hexadecimal 00.

Figure 2B:
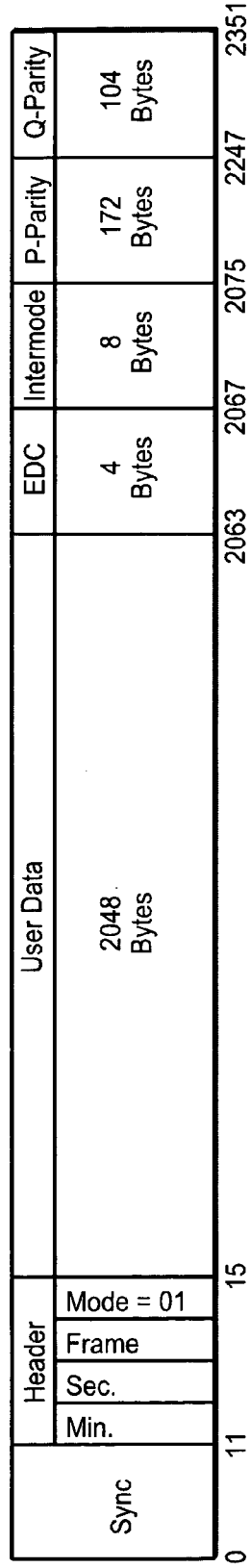

FIG. 2B shows a format appropriate for sector mode 01. As shown in FIG. 2B, for sector mode 01 user data is 2048 bytes between bytes 16 and 2063. After the user data section, a 4 byte EDC field, an 8 byte interval field, a 172 byte P-parity field, and a 104 byte Q-parity field is included. The EDC (error detection code) field provides an error detection procedure based on bytes 0 through 2063. Error correction fields, P-parity and Q-parity, detect errors using bytes 12 to 2075 and bytes 12 to 2247, respectively. Calculations of EDC, P-parity and Q-parity are illustrated further in ECMA-130 standard. The user data in sector mode 01 is protected by EDC (error detection code), ECC (error correction code) and CIRC (cross-interleaved Reed-Solomon encoding). Processing for CIRC encoding is also illustrated in the ECMA-130 standard.

Figure 2C:
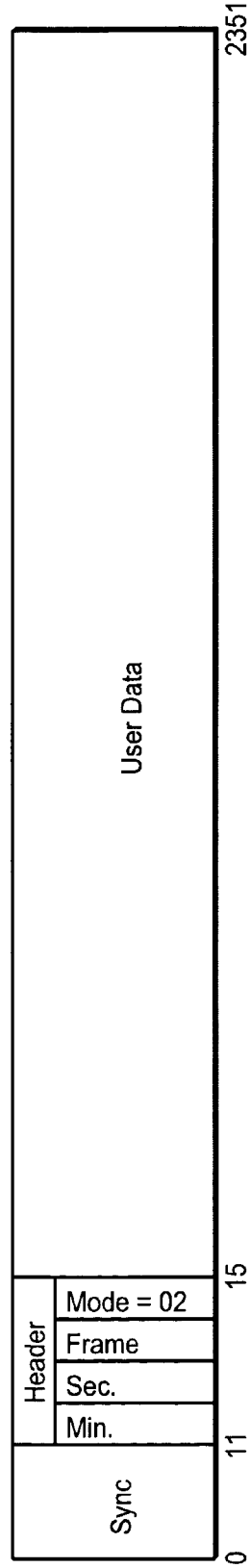

FIGS. 2C, 2D and 2E illustrate sector formats appropriate for sector mode 02. As shown in FIG. 2C, in sector mode 02 formatted data, bytes 16 to 2351 are designated for user data. However, as shown in FIG. 2D, the user data bytes can be separated into subheaders and error coding. In FIG. 2D, for example, the user data field is reduced to 2048 bytes and subheader 1 and subheader 2 fields as well as EDC, P-parity, and Q-parity fields are included. Subheader 1 and subheader 2 can each include fields for file number, channel number, submode, and coding interval. The submode field can include a flag which indicates whether the sector is formatted in Form I or Form II. Form I includes EDC, P-parity and Q-parity fields as shown in FIG. 2D, where the EDC field is computed based on bytes 16 through 2075 and the ECC fields (P-parity and Q-parity) are computed based on bytes 12 through 2351, as indicated in the ECMA-130 standard. Form II as shown in FIG. 2E only includes an EDC field in bytes 2348 through 2351 where the EDC field is computed using bits 16 through 2351.

Subheaders include flags and other information indicating the types of data in the user data field. Data encoding is data format and media format dependent. In other words, data is encoded differently for the various formats and will be different for CD-Audio, Text, Video or other formats. The data section is the encoded data directly received from host 103. Examples of some subcode and data format specifications are discussed in U.S. application Ser. No. 09/393,785, "Autodisk controller", filed on Sep. 10, 1999, and U.S. application Ser. No. 09/130,999, now U.S. Pat. No. 6,332,176, "Autohost controller", filed on Aug. 7, 1998, each of which is assigned to the same assignee as is the present disclosure, each of which is incorporated herein by reference in its entirety.

As shown in FIGS. 2A through 2E, much of the data actually written onto drive 102 is generated by controller 101 itself under the direction of microprocessor 106. For example, the sync, header, subcode, EDC, and ECC fields are generated by controller 101. As has been discussed above, the constant monitoring and control functions of microprocessor 106 limits the data transfer rate between host 103 and drive 102. Further, the size of the firmware code required to perform the monitoring and control functions of microprocessor 106 is large, requiring that ROM 107 be large.

However, the monitoring and control functions of microprocessor 106 are often repetitive and the data generated by controller 101 in the encoding process is also repetitive, although the precise procedure may depend on individual data and media formats. The repetitive nature of the process can be utilized to relieve the functions of microprocessor 106 in favor of hardwired monitoring solutions. The hardwired monitoring solutions can be significantly faster in performing the monitoring and control functions formally undertaken by microprocessor 106 and, in addition, reduces the amount of firmware required, reducing the size of ROM 107 that is required.

Figure 3:
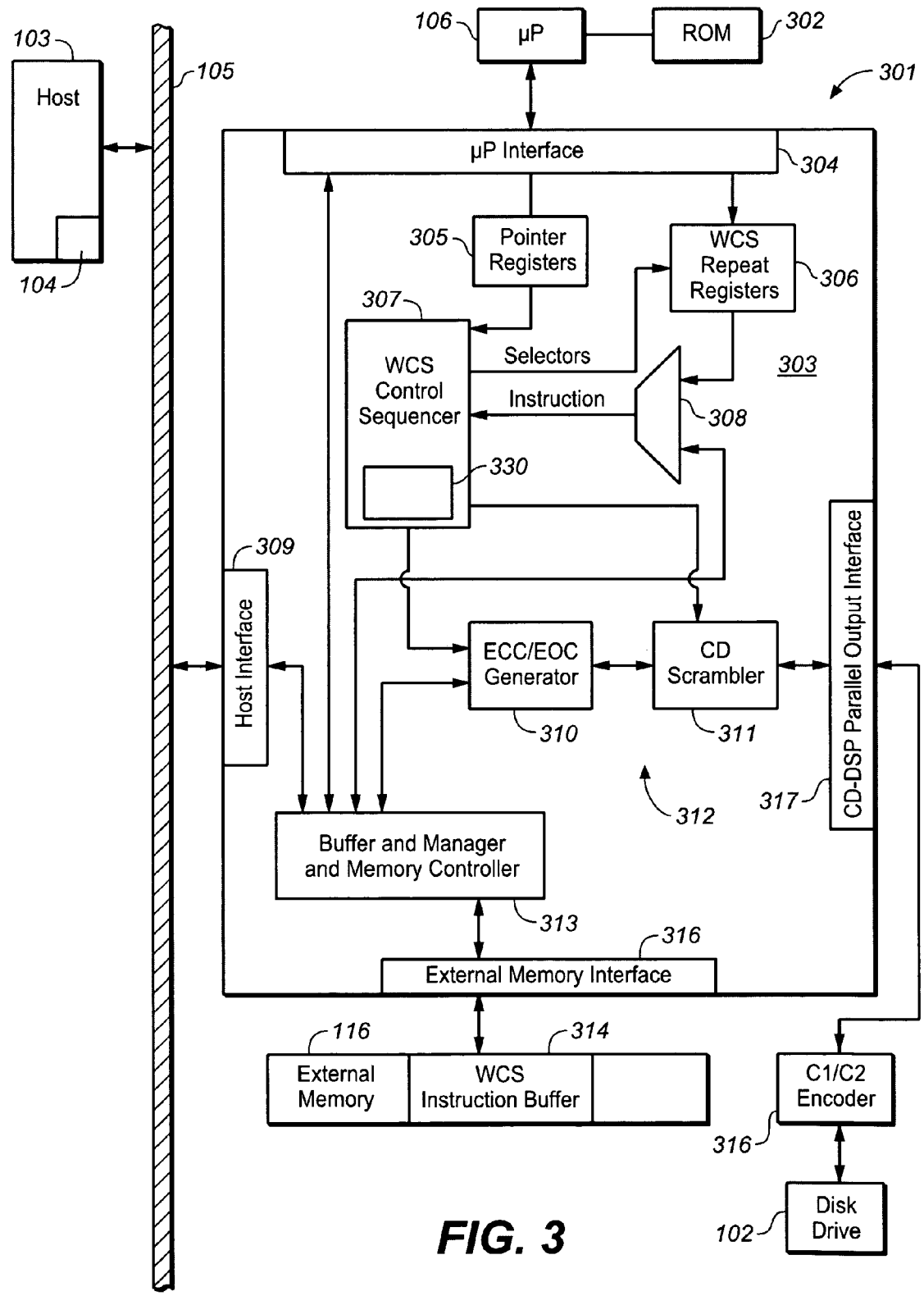
FIG. 3 shows a block diagram of the write circuits of a controller according to the present invention.

FIG. 3 shows an embodiment of a controller 301 according to the present invention. Controller 301 includes a write control sequencer circuit 303 that monitors and controls the data transfer between host 103 and drive 102. Microprocessor 106 can program WCS descriptors, for example data descriptors and subcode descriptors, either to external memory 116 or to on-chip registers such as WCS repeat registers 306 in order to perform the repetitive tasks inherent in data transfer from host 103 to disk drive 102. Write control sequencer circuit 303 then executes instructions contained in the data descriptors and subcode descriptors to control and monitor data received by host 103, encoded by encoder 312, which includes ECC/EDC generator 310 and CD Scrambler 311, and transferred to drive 102 through drive interface 317 and, in some embodiments, further encoded by C1/C2 encoder 316.

C1/C2 encoder 316 provides level 1 and level 2 ECC/EDC encoding to data being written onto an optical media of disk drive 12. Further, C1/C2 encoder 316 handles the actual writing of data to the optical media of disk drive 102. As such, C1/C2 encoder 316 includes drive control circuitry 113 and encoding/decoding circuitry 112 as shown in FIG. 1. ECC/EDC generator 310 provides level 3 error encoding for data written onto an optical media of disk drive 12. In some embodiments, all error encoding can be performed in ECC/EDC generator 310 and C1/C2 encoder 316 may be embedded within controller 301.

Additionally, in some embodiments microprocessor 106 and ROM 302 are embedded in controller 301, which depicts a single integrated circuit. Although any microprocessor can be utilized, microprocessor 106 embedded on controller 301 can be an ARM7TDMI processor. Further, ROM 107, which can also be embedded onto controller 301, can be flash memory. In that fashion, the processor code for microprocessor 106 can be updated by host 103.

Data and subcode descriptors provide instructions to WCS circuitry 303 regarding the processing of data received from host 103 and the data that is generated by WCS circuitry 303. An embodiment of the format of a data descriptor is shown in Table I and an embodiment of the format for a subcode descriptor is shown in Table VIII. Tables II through VII and IX through XX provide further information regarding the options and fields available in the data descriptor and subcode descriptors shown in Tables I and VIII, respectively.

The data descriptors and subcode descriptors for the data received from host 103 are constructed by microprocessor 106 in response to a write command received from host 103. In general, the data descriptors and subcode descriptors are stored in memory 116 until read by memory controller 313. Once read by memory controller 313, the data descriptors and subcode descriptors are interpreted by WCS control sequencer 307, which then executes the appropriate encoding sequence for the type of data indicated by the descriptors. In some embodiments, data descriptors and subcode descriptors can be stored in repeat registers 306.

The write control sequencer 307 is coupled to pointer registers 305 and repeat registers 306. WCS descriptors (both data and subcode descriptors) fetched either from external memory 116 or from WCS repeat registers 306 through multiplexer 308 can be stored in an intermediate dual buffer 330 in WCS control sequencer 307. As shown in FIG. 3, WCS instruction buffer 314 may be included in external memory 116. User data and preformatted data, i.e. data generated by microprocessor 106 or formatted by WCS control sequencer 307, is also stored in external memory 116. The user and preformatted data stored in memory 116 are read from memory 116 and written into external memory 116 in response to different operations as controlled by WCS sequencer 307 in response to programmed instructions contained in WCS descriptors.

ECC/EDC generator 310 encodes the data and subcode data in response to the WCS instruction buffer and instructions from the WCS control sequencer 307. As is shown in Tables I through XX, the types of encoding performed depends on the data type and the media on which the data is to be written. Data from ECC/EDC generator 310, which would be in the sector format appropriate for writing on the optical disk in disk drive 102, is input to scrambler 311 and output to C1/C2 encoder 316.

The components of controller 301 that are shown in FIG. 3 are those components involved in writing data to media in disk drive 102. Further information regarding reading data from media in disk drive 102 can, for example, be found in U.S. application Ser. No. 09/393,785 and U.S. Pat. No. 6,332,176, which have been incorporated by reference into this application.

Figure 4:
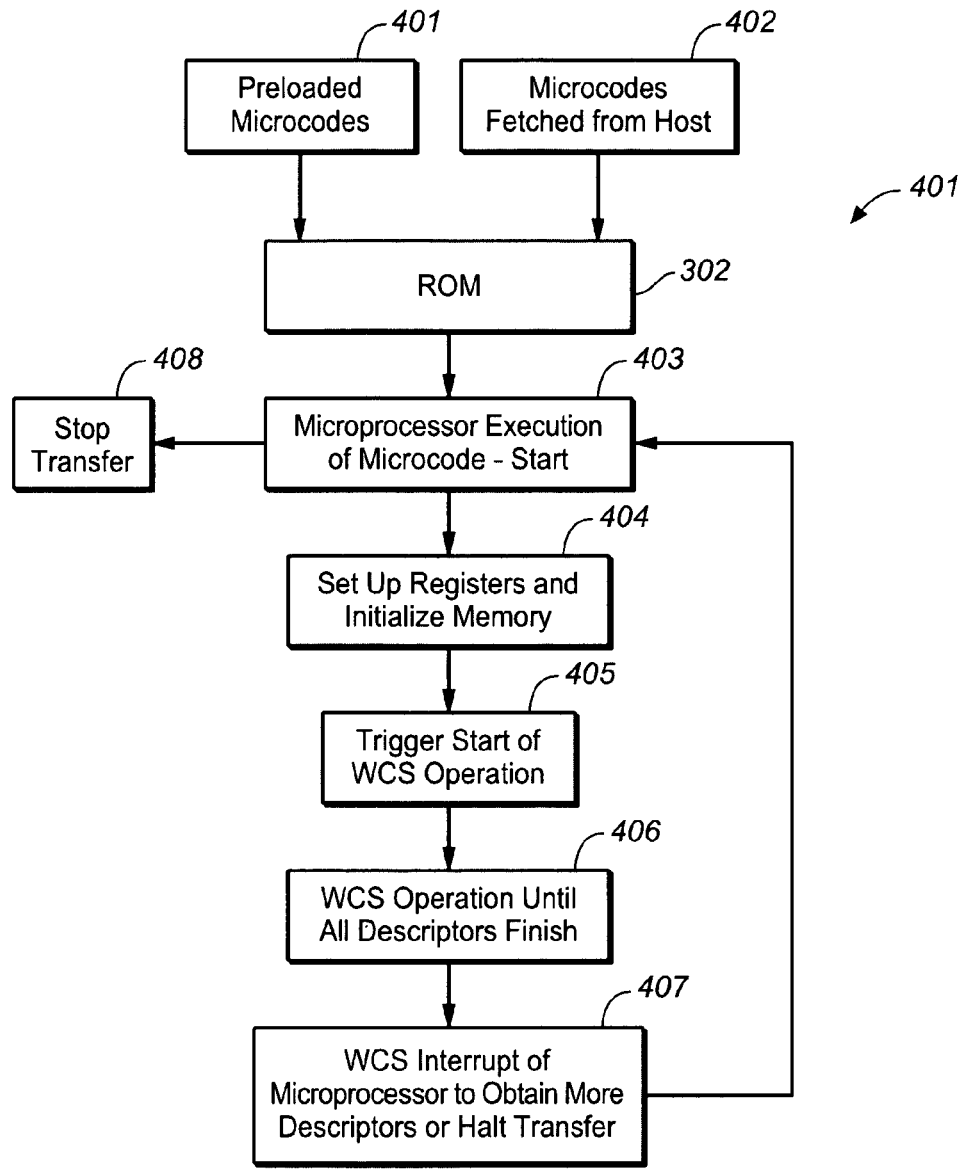
FIG. 4 illustrates a firmware flow chart executed by a microprocessor in accordance with aspects of the present invention.

FIG. 4 shows an embodiment of a flow chart 401 performed by firmware in microprocessor 106 in accordance with the firmware code stored in ROM 302. As shown in FIG. 4, the microcode stored in ROM 302 may be preloaded in step 401 or written into ROM "on-the-fly" in response to instructions from host 103. In some embodiments of the invention, host 103 communicates with controller 301 using ATAPI standard protocols. The ATAPI standard is further explained in Small Form Factor Committee, "Specification of ATA Packet Interface for CD-ROMs, SFF-8020i," Revision 2.5, Jul. 21, 1995, herein incorporated by reference in its entirety. In step 403, microprocessor 106 reads microcode instructions from ROM 302. CD-ROM appendix A includes an example of microcode instructions that may be loaded into ROM 302 and executed by microprocessor 106 in controller 301.

In step 404, in response to a write command from host 103, registers in controller 301 and external memory 116 are initialized by microprocessor 106 in accordance with the microcode instructions read from ROM 302. Additionally, host 103 can be configured in this step if there is a need to reconfigure host 103 from a default state. In step 404, WCS descriptors (both data descriptors and subcode descriptors) are written into controller 301. In some embodiments, data and subcode descriptors may be written into memory 116. In some embodiments, or in some situations, data and subcode descriptors may be written into repeat registers 306. For example, if certain data blocks are to be repeatedly encoded for a number of times, then descriptors may be written into repeat registers 306.

Figures 8, 8A, 8B:
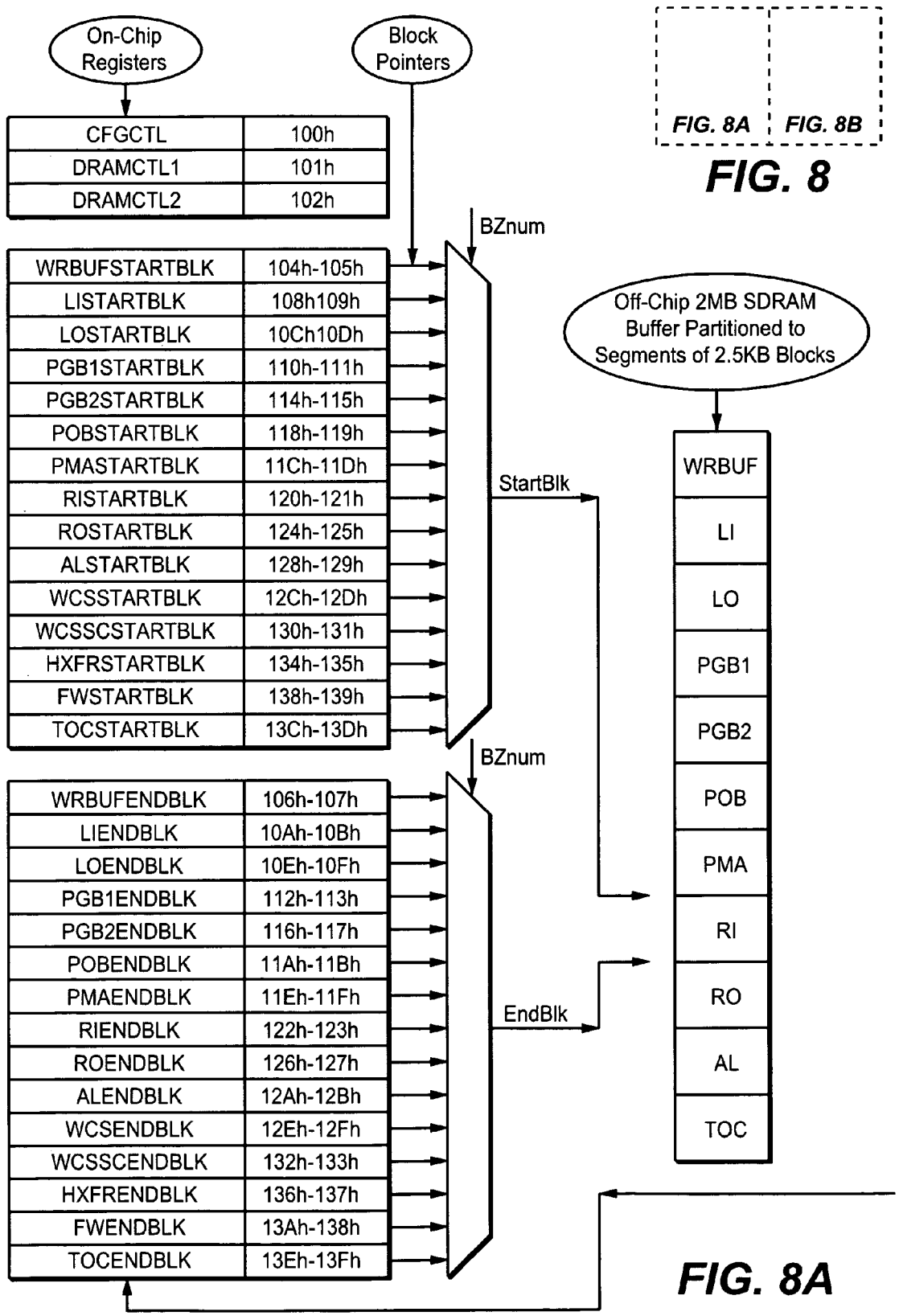
FIG. 8 illustrates the pointer registers according to the present invention.
Figure 8B:
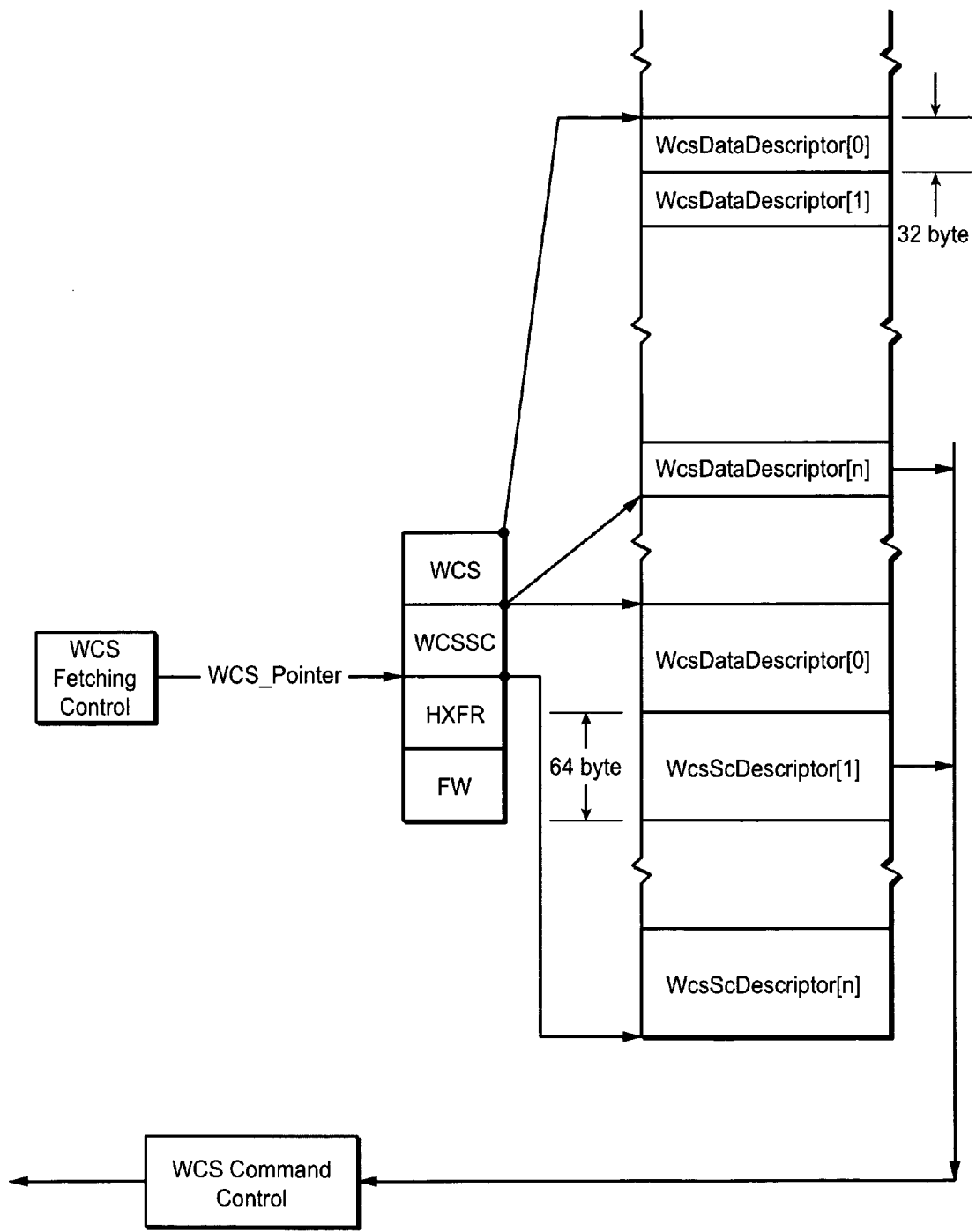

Also, in step 404, registers in pointer registers 305, repeat registers 306, and WCS control sequencer 307 are initialized. In some embodiments, pointer registers 305 include registers which point to various descriptors stored in memory 116. Further, as is illustrated in FIG. 8, pointers to access stored user data for various zones are included in pointer registers 305. In some embodiments, repeat registers 306 record repeated sequences of descriptors and the order of executing the descriptors.

In step 405, microprocessor 106 triggers the start of operation of WCS control sequencer 307. In step 406, WCS control sequencer 307 operates to encode data according to instructions contained in the WCS descriptors so long as there are descriptors left to execute. During this process, microprocessor 106 waits for interrupts from controller 301. WCS Control Sequencer 307, then, can control all the data and subcode writes to C1/C2 encoder 316.

Microprocessor 106 only writes the descriptors and control registers to start, stop or pause the operation of controller 301, as needed. Data types to be recorded onto an optical media in disk drive 102 can be classified into the following types: user data, lead-in, lead-out, pregap, postgap, PMA, run-in, run-out, audio-link, PCA test, and PCA count. Only the user data varies and needs to be fetched from host 103. The other data types are fixed and can be preformatted into memory by microprocessor 106 at the same time that the descriptors are loaded into controller 301. In some cases, even some of the user data can be preformatted. As a result, high-speed operation can be achieved through use of WCS control sequencer 307.

The data and subcode descriptors constructed by microprocessor 106 in response to the microcode instructions stored in ROM 302 provide the instructions for WCS control sequencer 307 to format data sectors such as those described above with respect to FIGS. 2A through 2E. The data sectors are then output to C1/C2 encoder 316 for writing onto the optical media of disk drive 102. WCS control sequencer 307, therefore, operates similarly to a programmable co-processor which executes the instructions contained in the data and subcode descriptors in order to perform different operations of the encoding process. As shown in tables I through XX, the descriptors instruct WCS control sequencer 307 with such information as the number of blocks of data to encode, the data types, which zones to write and read data to and from, what timing header (minute, second, frame, mode) to write, and how many times to repeat certain zones.

In step 405, microprocessor 106 starts WCS control sequencer 307 to begin writing data from host 103 onto the optical media stored in disk drive 102 via memory 116 or to begin fetching preformatted data previously initialized in memory 116 by microprocessor 106. At this point, monitoring functions are carried out by the hardware of controller 301 and microprocessor 106 only functions to monitor the overall task of WCS control sequencer 307. All routine functions, such as receipt of data, encoding of data, and writing of data to output interface 317 are performed by the hardware of controller 301. In some embodiments, to speed up the transfer process, parallel processing can be applied. In other words, data transfers between host 103 and memory 116 may occur during the time that microprocessor 106 is storing data and subcode descriptors and controller 301 is sending encoded data to C1/C2 module 316 for recording to the optical media of disk drive 102.

In step 407, once all of the current descriptors have been executed WCS control sequencer 307 of controller 301 signals microprocessor 106. In some embodiments, the signal may be an interrupt. In some embodiments, microprocessor 106 may be signaled in advance of the finish of execution of all of the WCS descriptors so that more descriptors can be written before they are needed. If the data transfer process is complete, microprocessor 106 stops the transfer in step 408.

Figure 5:
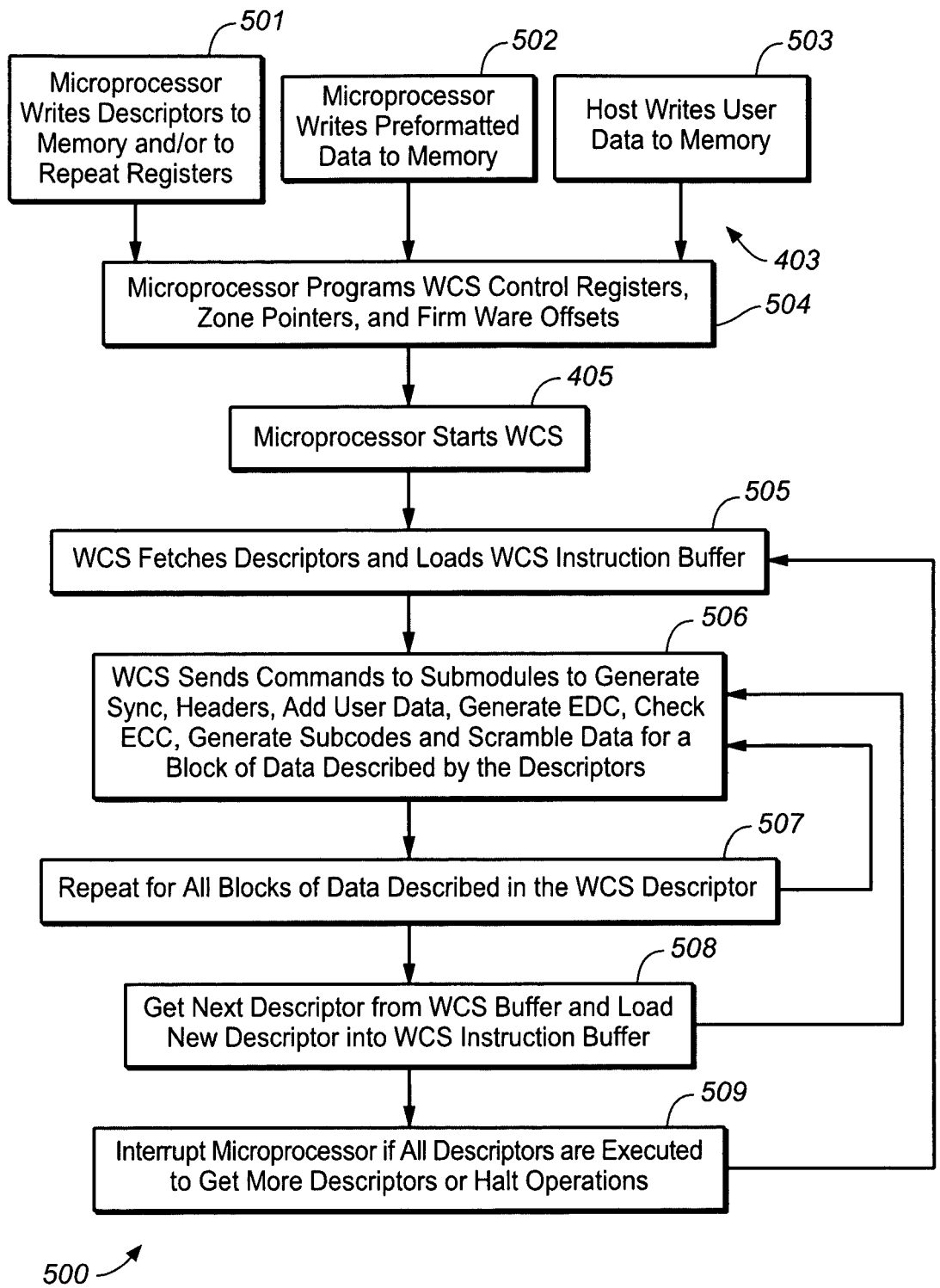
FIG. 5 illustrates a flow chart for a write control sequencer according to the present invention.

FIG. 5 shows an example flow chart for operation of controller 301 (FIG. 3), including WCS control sequencer 307. As discussed with FIG. 4, in step 403 microprocessor 106 initializes memory 116 and pointer registers 305 and 306 as well as determining any preformatted user data. As shown in FIG. 5, step 403 can be separated into several blocks. In step 501, microprocessor 106 writes WCS descriptors (the data descriptors and subcode descriptors) into memory 116 and/or into repeat registers 306. In step 502, microprocessor 106 writes preformatted data into memory 116. In step 503, host 503 starts writing user data to memory 116. In step 504, microprocessor 106 programs WCS control registers in WCS control sequencer 507, including zone pointers and firmware offsets. In step 405, microprocessor 106 starts operation of WCS control sequencer 307. After step 405, microprocessor 106 waits for interrupts from WCS control sequencer 307. At that point, monitoring and control functions for transfer of data from host 103 to disk drive 102 is performed by WCS control sequencer 307 under the direction of commands contained in the data descriptor and the subcode descriptor.

In step 505, WCS control sequencer 307 fetches data and subcode descriptors and loads WCS instruction buffer 314. Data and subcode descriptors are fetched either from repeat registers 306 or from memory 116, depending on the status of WCS registers preloaded before starting WCS control sequencer 307 by microprocessor 106.

In some embodiments of the invention, data and subcode descriptors are utilized in pairs. Data descriptors, an example of which is illustrated in Table I and subsequent tables, includes instructions to WCS control sequencer 307 regarding data generation and modification of the logic of WCS control sequencer 307. Subcode descriptors include instructions to WCS control sequencer 307 regarding generation of subcodes. As discussed above, descriptors can be fetched from memory 116 or preprogrammed in repeat registers 306. In some embodiments, descriptors can be fetched from memory 116 and from repeat registers 306 as instructed by instructions executed in previously executed data descriptors or initialized by microprocessor 106. In some embodiments, WCS descriptors (both data and subcode descriptors) are stored in WCS instruction buffer 314 before execution by WCS control sequencer 307. In some embodiments, WCS control sequencer 307 includes a buffer for storing descriptors. In some embodiments, buffer 330 is large enough to store two or more sets of WCS descriptors.

In some embodiments, whenever there is room in buffer 330 of WCS control sequencer 307 and there is a difference between the hardware offset and the firmware offset in memory 116, WCS control sequencer 307 will fetch descriptors to fill the available slots in buffer 330. The firmware offset points to the starting address of the next WCS descriptor to be executed while the hardware offset points to the next WCS descriptor to be fetched. If WCS descriptors are to be used from repeat registers 306, then WCS control sequencer 307 will retrieve the next descriptors from WCS repeat registers 306 to fill the open slot in buffer 330 in WCS control sequencer 307.

In step 506, WCS control sequencer 307 sends commands to individual modules to generate sync, headers, add user data, generate EDC data, check ECC, generate subcodes, and scramble data for a block of data described and controlled by the WCS descriptors currently being executed. For both data and subcode descriptors, WCS control sequencer can read user data and subcode fetched from host 103 and stored in memory 116 or read preformatted data and subcode programmed in memory 116 by microprocessor 106 during step 403 as shown in FIGS. 4 and 5. Depending on instructions in the descriptors, WCS control sequencer 307 can generate headers, which include absolute and relative Hour, Minute, Second, and Frame data, to both data and subcode portions of each block to be recorded. Headers can have either decimal or hexadecimal format and can increase or decrease as desired. Also, for a variety of different CD and DVD formats and functions like TOC, PMA, ISRC, MCN and RID, WCS control sequencer 307 can automatically handle, under the instructions contained in the WCS descriptors, all the detail functions that normally would require firmware and microprocessor 106 to control. Operating in this way, WCS control sequencer 307 relieves microprocessor 106 of most of its monitor and control functions. WCS control sequencer 307, in response to instructions in the WCS descriptors, can also instruct ECC generator 310 to carry out the ECC operation, generate P-parity and Q-parity for data types that require such a format, and generate various EDC formats for data. WCS control sequencer 307 also can instruct CD scrambler 311 to scramble data and generate sync code for the data sectors.

In step 507, step 506 is repeated for all blocks of data that are controlled by the WCS descriptors that are currently being executed. In step 508, the WCS descriptors that are to be executed next are loaded into WCS control sequencer 307. Further, WCS control sequencer 307 is triggered to load another WCS descriptor into WCS instruction buffer 314 as described above. Step 508 returns to step 506 to execute the instructions contained in the newly loaded WCS descriptors. In step 509, WCS control sequencer 307 interrupts microprocessor 106 in order to prompt microprocessor 106 into reinitializing memory 116 and registers 305 and 306 with new descriptors and initial instructions.

As sectors are filled by WCS control sequencer 307, data is written from ECC/EDC generator 310 and scrambler 311 to disk drive 102 through interface 317. In step 504, microprocessor 106 determines whether all of the user data to be transferred from host 103 to disk drive 102 has been written to disk drive 102. If it has, the write control sequence hardware of controller 301 stops and processing control reverts to microprocessor 106. As discussed above, if there is more user data to process, then microprocessor 106 reloads controller 301 with new WCS descriptors and starts WCS control sequencer 307 in step 505 in order to process data in accordance with the next data descriptor and subcode descriptor in the sequence.

Figure 6A:
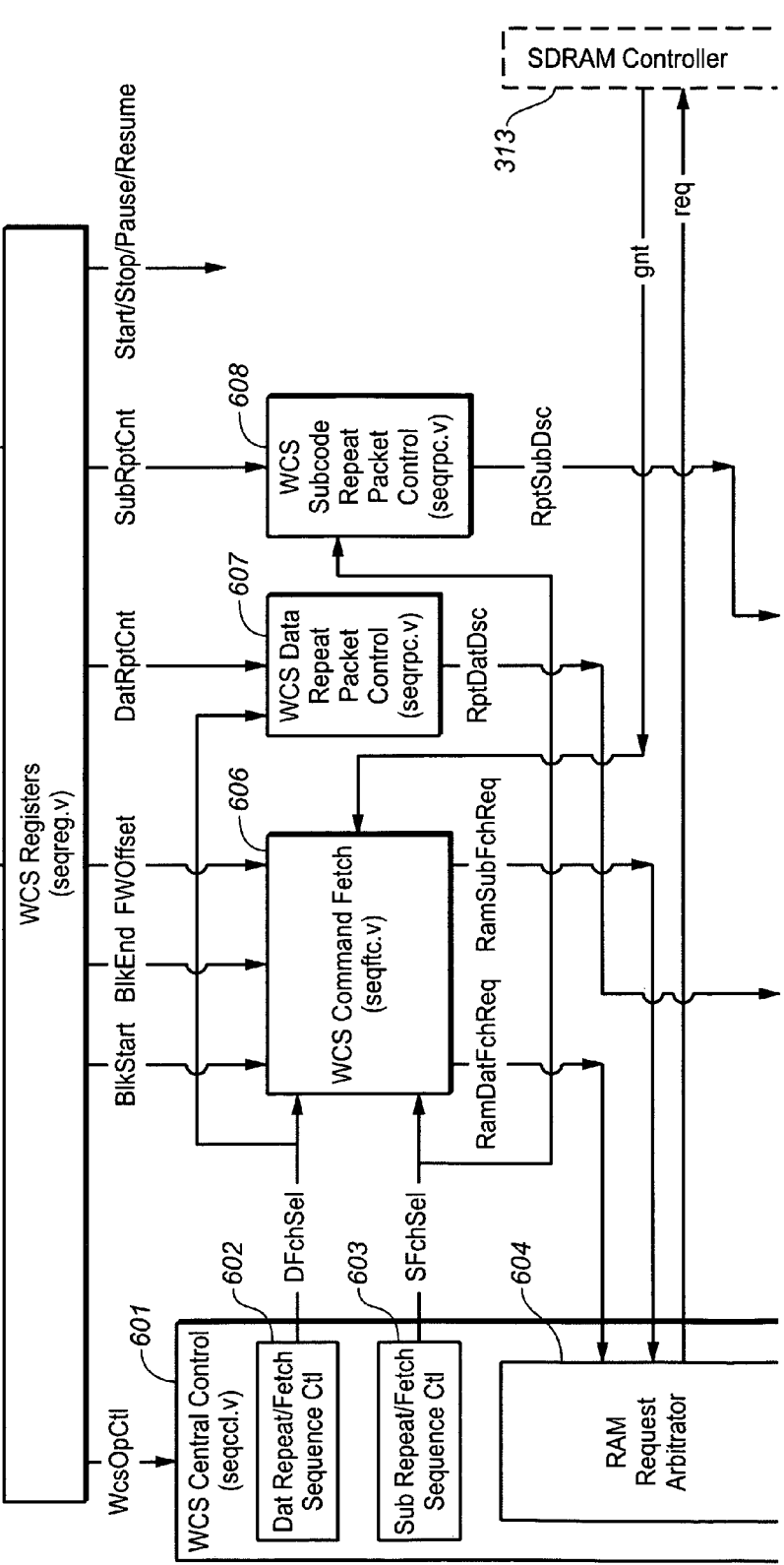
FIG. 6 is a block diagram of an embodiment of the write control sequencer shown in FIG. 3.
Figure 6B:
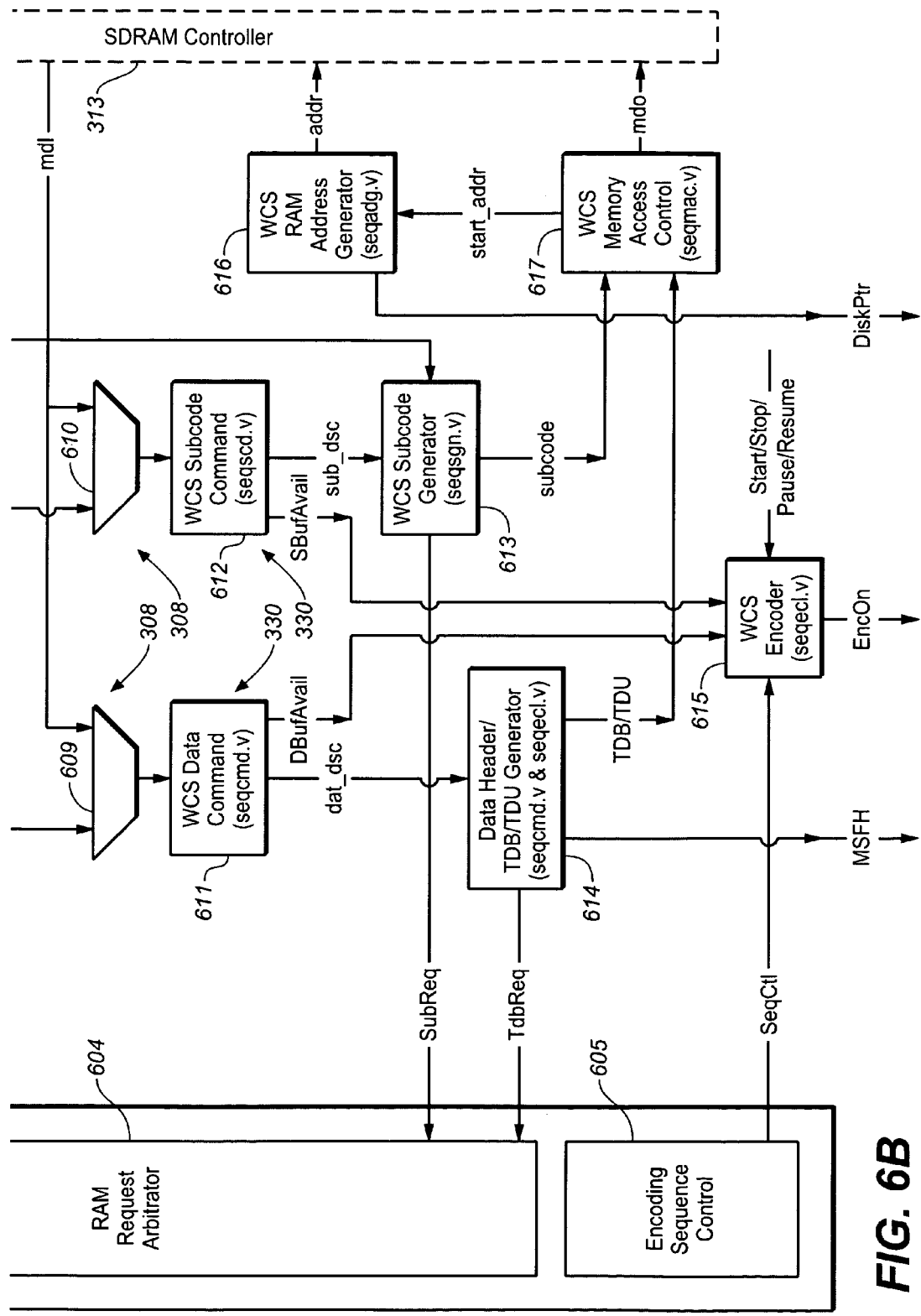

FIG. 6 shows a block diagram of an embodiment of a WCS control sequencer 307 according to the present invention. Registers 618 include both pointer registers 305 and WCS repeat registers 306, as have been previously discussed. As discussed above, registers 618 are coupled to microprocessor interface 304. WCS sequence controller 307 includes a central controller 601, a WCS command fetch 606, a WCS data repeat packet controller 607, a WCS subcode repeat packet controller 608, WCS data command interpreter 611, WCS subcode command interpreter 612, data header generator 614, WCS subcode generator 613, WCS encoder 615, WCS RAM address generator 616, and WCS memory access controller 617. Multiplexer 308 shown in FIG. 3 is shown in FIG. 6 as multiplexers 609 and 610. Buffer 330 of FIG. 3 includes WCS data command 611 and WCS subcode command 612 as shown in FIG. 6. WCS central control 601 includes a data repeat/fetch sequence control 602, subcode repeat/fetch sequence control 603, RAM request arbitrator 604, and encoding sequence controller 605.

Under the control of WCS command fetch 606, data descriptors from either SDRAM controller 313 or from WCS repeat registers 306, through WCS data repeat packet controller 607 and WCS subcode repeat packet control 608, are loaded into WCS data command 611 and WCS subcode command 612 of buffers 330. Data descriptors are then input to data header generator 614 and subcode descriptors are input to WCS subcode generator 613. Data header generator 614 decodes the data descriptor and provides the encoded commands to central control 601 and other components of WCS control sequencer 307. Similarly, WCS subcode generator 613 decodes the subcode descriptor and provides commands to central control 601 and other components of WCS control sequencer 307.

In some embodiments, WCS repeat registers 306 can store multiple data descriptors. For example, in some embodiments three data descriptors can be stored in WCS repeat registers 306. Similarly, in some embodiments, WCS repeat registers 306 can store multiple subcode descriptors, for example three. When a repeat sequence is initiated, counters in WCS registers 618, DatRptCnt and SubRptCnt in FIG. 6, indicate how many times the sequence of descriptors in WCS repeat registers 306 are repeated. Reading out of descriptors from WCS repeat registers 306 is controlled by WCS data repeat packet control 607 and WCS subcode repeat packet control 608. Data descriptors output by WCS data repeat packet control 607 are input to multiplexer 609. Subcode descriptors output by WCS subcode repeat packet control 608 are input to multiplexer 610. As discussed above, multiplexers 609 and 610 provide buffer 330 with descriptors from external memory 116 through controller 313 or with descriptors from WCS data repeat packet control 607 and WCS subcode repeat packet control 608 in accordance with sequence controls from WCS central controller 601.

WCS central controller 601 sequences through which WCS descriptors to be used at each specific block. WCS central controller 601 sends apropriate control commands to WCS command fetch 606 to fetch WCS descriptors from memory 116 or to WCS data and subcode repeat packet control 607 and 608 to fetch WCS descriptors already stored in registers. Data Repeat/Fetch Sequence control 602 of WCS central control 601 outputs a signal DfchSel to WCS command fetch 606 and to WCS data repeat packet control 607 determining whether the data descriptor should originate from WCS data repeat packet control 607 or from memory 116. Similarly, Subcode Repeat/Fetch Sequence control 603 outputs a signal SfchSel to WCS command fetch and to WCS subcode repeat packet control 608 to determine whether the subcode descriptor should originate from WCS subcode repeat packet control 608 or from memory 116. In some embodiments, a control register in WCS registers 618 includes the sequence in which descriptors are to be fetched, from where the descriptor is to be fetched, and how many times that descriptor is executed. Based on these registers, central controller 601 directs the order in which descriptors are executed while the encoding process is being monitored.

Data repeat/fetch sequence control 602, then, monitors the repeat countdown timer in WCS registers 618 and also the repeat registers in order to determine when WCS data repeat packet control 607 is finished repeating and if WCS data repeat packet control 607 should be refilled for the next repeated sequence. Additionally, subcode repeat/fetch sequence controller 603 monitors the subcode repeat counter in WCS registers 618 and also the subcode repeat registers 306 in order to determine when WCS subcode packet control 608 is finished repeating and if WCS subcode repeat packet controller 608 should be refilled for the next subcode repeat sequence.

In response to signals from Data repeat/fetch sequence controller 602, multiplexer 609 chooses a data descriptor output from WCS data repeat packet controller 607 or a data descriptor received from memory controller 313. Similarly, in response to signals from subcode repeat/fetch sequence controller 603, multiplexer 610 chooses a subcode descriptor output from WCS subcode repeat packet controller 608 or a subcode descriptor received from memory controller 313.

When WCS command fetch 606 is directed by Data Repeat/Fetch Sequence controller 602 to obtain the data descriptor from memory 116, WCS command fetch 606 outputs to RAM Request arbitrator 604 of WCS central control to fetch the next data descriptor. The request is then sent to memory controller 313 and the requested data descriptor is obtained. When WCS command fetch 606 is directed by subcode repeat/fetch sequence controller 603 to fetch the next subcode descriptor, WCS command fetch 606 outputs to RAM request arbitrator 604 to obtain the next subcode data descriptor. RAM Request Arbitrator 604 then requests of memory controller 313 that the subcode data descriptor be retrieved.

Multiplexer 609 chooses a data descriptor to utilize for processing data based on a control signal from WCS central control 601. Additionally, multiplexer 610 chooses a subcode descriptor based on a control signal from WCS central control 601. The data descriptor is input to WCS data command 611. WCS data command 611 interprets commands from the data descriptor and supplies descriptor commands to data header generator 614 and controls availability of the data buffer. WCS subcode command 612 interprets commands from the subcode descriptor and supplies subcode commands to WCS subcode generator 613. The resulting header and subcode can be written into memory 116 through WCS memory access control 617. Data buffers and subcode buffers can be controlled through WCS encoder 615, which is also controlled by encoding sequence control 605.

In the encoding process, a block of data that has been prepared with a data sync field, header, subheader, if required, and error code information is prepared at WCS encoder 615. The data may include ECC and EDC information and supplemental data such as TDB and TDU and subcode information (P, Q, R, S, T, U, V, W). Blocks of data prepared at WCS encoder 615 are then stored in memory 116. WCS encoder 615 then sends these blocks of data to C1/C2 encoder 316 in sequence as indicated by the block header. As such, WCS encoder 615 monitors and maintains an internal memory pointer, which is controlled and generated by submodule WCS RAM address generator 616. WCS encoder 615 then communicates, typically through internal handshaking signals, to interface module 317 to transmit the data to C1/C2 submodule 316, which actually records the data and subcodes to an optical media in disk drive 102.

Figure 7A:
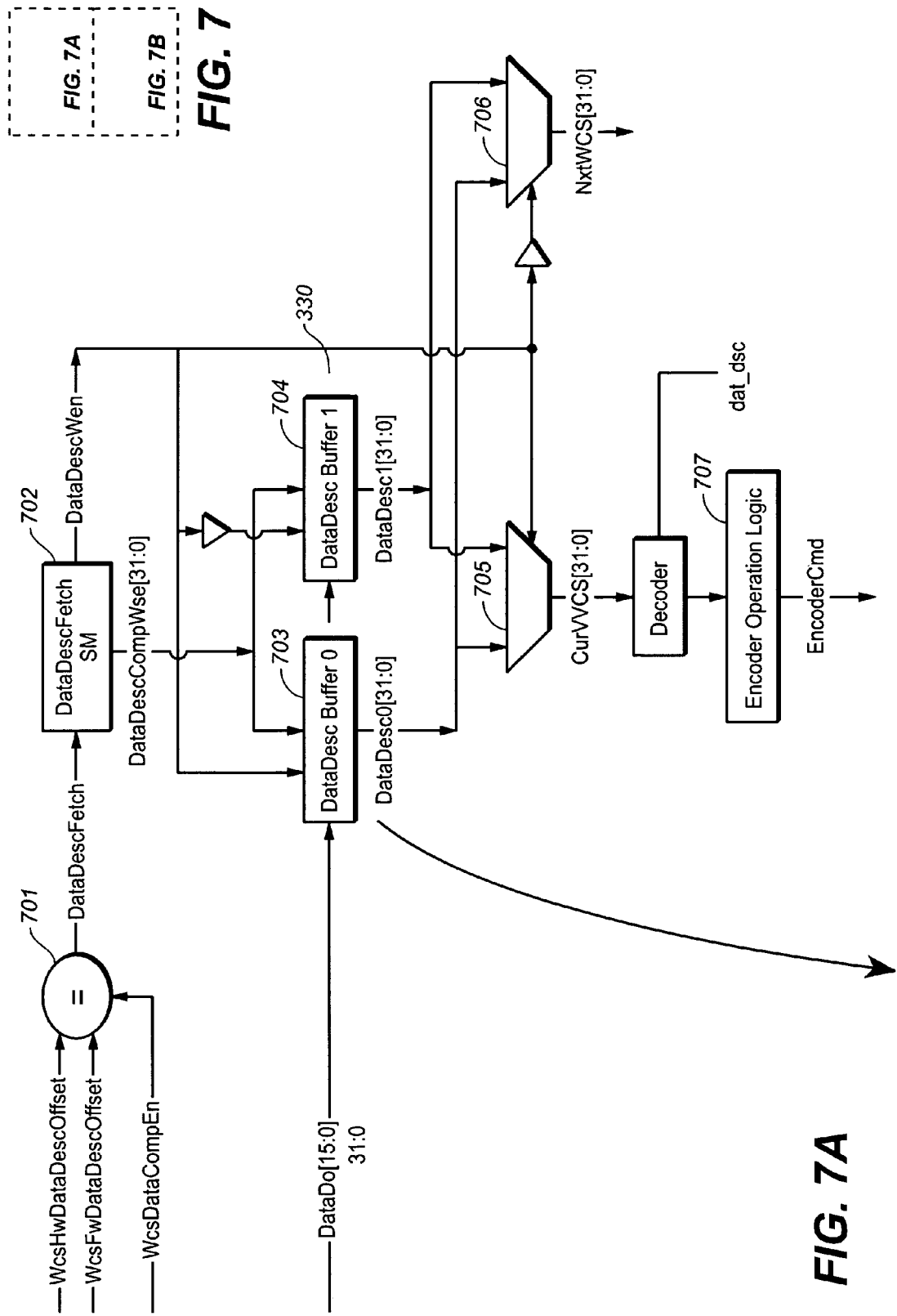
FIG. 7 illustrates a descriptor fetching processes according to the present invention.
Figure 7B:
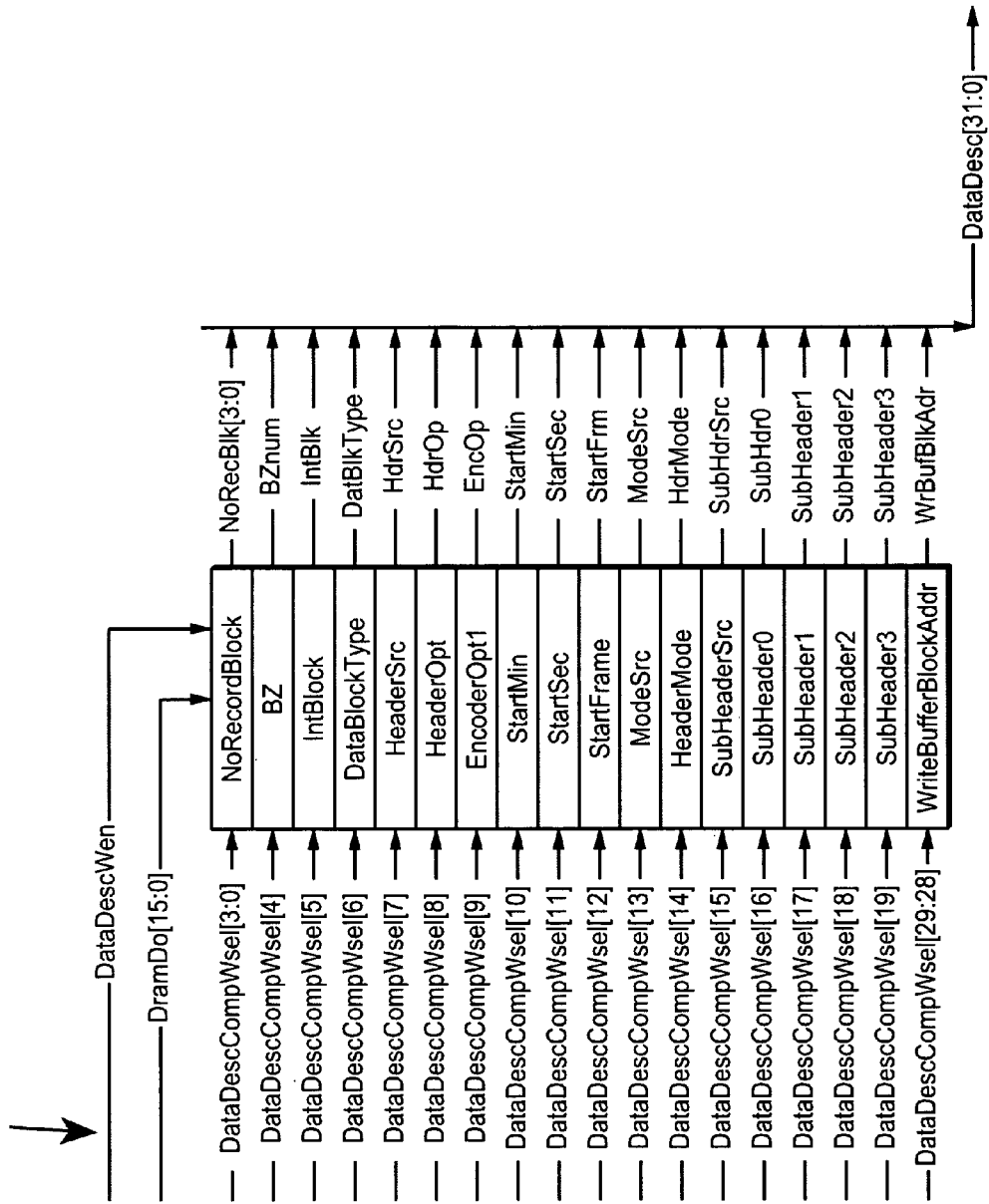

FIG. 7 illustrates the process for loading data descriptors into buffer 330 according to some embodiments of the present invention. Buffer 330 includes buffers 703 and 704 in FIG. 7. A data descriptor offset value between a firmware setting and the current hardware setting are compared in comparator 701. Data descriptors are programmed by microprocessor 106 and stored in a descriptor zone portion of memory 116. Likewise for WCS subcode descriptors. Microprocessor 106 then sets a pointer in registers 618 to point to the descriptors up to and including the pointer stored in the descriptor zone of memory 116. WCS control sequencer 307 utilizes descriptor pairs one at a time. Each WCS descriptor (including a data and subcode descriptor) is used for the number of blocks of data to be encoded as specified in the WCS descriptor.

WCS control sequencer 307 starts with the first descriptor, whose location is called the descriptor hardware offset. The descriptor hardware offset is programmable by firmware through microprocessor 106. WCS control sequencer 307 increments the hardware offset by one each time it finishes using one descriptor. The hardware offset and firmware offset are compared in comparitor 701. If there is a difference, and there is room in WCS descriptor buffer 703 or 704 (which are included in WCS data command 611 and WCS subcode command 612, respectively), then DataDescFetch 702 initiates a fetch of descriptors from memory 116 to fill those buffers. When the hardware offset reaches the descriptor boundary, then it wraps around in a circular buffer fashion.

The data descriptor (shown as DramDo in FIG. 7) is presented to one of the two descriptor buffers 703 and 704. The following data descriptor is presented to the other one of buffers 703 and 704. In that fashion, the next data descriptor can be obtained while the data is currently being processed under the current data descriptor. Multiplexers 705 and 706 choose which of the two data descriptors to present to encoder operation logic 707, where the data is encoded.

FIG. 8 shows an embodiment of pointer registers 305. As shown, pointer registers include starting and ending block addresses for each of the zones of data. The registers may be multiplexed into multiplexers 801 and 802 and utilized to access user data stored in memory 116. WCS fetching control utilizes a WCS pointer which indicates where the current data descriptor and subcode descriptor is stored in memory 116.

CD-ROM Appendix A includes an embodiment of a firmware code for an embodiment of controller 301 according to the present invention. CD-ROM Appendix A also includes an embodiment of Verilog code describing the logic design for an embodiment of the present invention. CD-ROM Appendix A is herein incorporated by reference in its entirety. Appendix B includes a directory of the files included in CD-ROM Appendix A and is herein incorporated by reference in its entirety.

The embodiments of the invention discussed in this disclosure are illustrative only and are not intended to be limiting. One skilled in the art will recognize various modifications which could be implemented without departing from the scope and spirit of the present disclosure. As such, the invention is limited only by the following claims.

Example Data and Subcode Descriptors

TABLE I (Embodiment of a format of a WCS Data Descriptor)

| Offset | Size (Bytes) | Item | Description |
|---|---|---|---|
| 0–3 | 4 | NoRecordBlock | Number of blocks for encoding |
| 4 | 1 | BZ | Buffer Zone Number See Table II |
| 5 | 1 | IntBlock | Interrupt in remain block count |
| 6 | 1 | DataBlockType | Data Block Type See Table III |
| 7 | 1 | HeaderSrc | Header Source See Table IV |
| 8 | 1 | HeaderOpt | Header Operation Valid when HeaderSrc = 1 (Header in WCS Descriptor) See Table V |
| 9 | 1 | EncoderOpt1 | Encoder Operation See Table VI |
| 10 | 1 | StartMin/PSN (BCD/Hex) | Header Start as Min Valid when HeaderSrc = 1 (Header in WCS Descriptor) |
| 11 | 1 | StartSec/PSN (BCD/Hex) | Header Start as Sec Valid when HeaderSrc = 1 (Header in WCS Descriptor) |
| 12 | 1 | StartFrame/PSN (BCD/Hex) | Header Start as Frame Valid when HeaderSrc = 1 (Header in WCS Descriptor) |
| 13 | 1 | ModeSrc | Mode Source See Table IV |
| 14 | 1 | HeaderMode | Header Mode Valid when HeaderSrc = 1 (Header in WCS Descriptor) |
| 15[0:3] | .5 | SubHeaderSrc | Subheader Source Valid when DataBlockType = 2 (XA) See Table IV |
| 15[4:7] | .5 | TDBDataSrc | TDB Data Source Valid when BZ = 4 (PGP2 Zone). Data offset starts from the $3^{rd}$ byte of 2048 data area. Hardware (H/W) will pre-fill 0 × 54 h, 0 × 44 h, 0 × 49 h from $0^{th}$ byte of 2038 data area. See Table VII |
| 16 | 1 | SubHeader0 | Subheader 0 Valid when DataBlockType = 2 (XA) |
| 17 | 1 | SubHeader1 | Subheader 1 Valid when DataBlockType = 2 (XA) |
| 18 | 1 | SubHeader2 | Subheader 2 Valid when DataBlockType = 2 (XA) |
| 19 | 1 | SubHeader3 | Subheader 3 Valid when DataBlockType = 2 (XA) |
| 20–21 | 2 | StartDiskBlockAddr | Start Disk block pointer for encode. The SartDiskBlockAddr is the physical block address (2.5K bytes) which is the Start Pointer within a specified zone of the buffer. If the StartDiskBlockAddr is outside of the range defined by the Start and End Block Addr of |

TABLE I-continued (Embodiment of a format of a WCS Data Descriptor)

| Offset | Size (Bytes) | Item | Description |
|---|---|---|---|
| | | | a zone or left as 0 then the Start Block Addr of that zone is used as the default StartDiskBlockAddr. |
| 22–23 | 2 | TDB data (Pre Gap Length) | Valid when BZ = 4 (PGP2 Zone). Data offset starts from the $3^{rd}$ byte of 2048 data area. Hardware (H/W) will pre-fill 0 × 54 h, 0 × 44 h, 0 × 49 h from $0^{th}$ byte of 2038 data area. |
| 24 | 1 | TDB data (TDU present) | Valid when BZ = 4 (PGP2 Zone). Data offset starts from the $3^{rd}$ byte of 2048 data area. Hardware (H/W) will pre-fill 0 × 54 h, 0 × 44 h, 0 × 49 h from $0^{th}$ byte of 2038 data area. |
| 25 | 1 | TDB data (Lowest Track #) | Valid when BZ = 4 (PGP2 Zone). Data offset starts from the $3^{rd}$ byte of 2048 data area. Hardware (H/W) will pre-fill 0 × 54 h, 0 × 44 h, 0 × 49 h from $0^{th}$ byte of 2038 data area. |
| 26 | 1 | TDB data (Highest Track #) | Valid when BZ = 4 (PGP2 Zone). Data offset starts from the $3^{rd}$ byte of 2048 data area. Hardware (H/W) will pre-fill 0 × 54 h, 0 × 44 h, 0 × 49 h from $0^{th}$ byte of 2038 data area. |
| 27 | 1 | TDU data (# track) | Valid when BZ = 4 (PGP2 Zone). Data offset starts from the $3^{rd}$ byte of 2048 data area. Hardware (H/W) will pre-fill 0 × 54 h, 0 × 44 h, 0 × 49 h from $0^{th}$ byte of 2038 data area. |
| 28 | 1 | TDU data (Write Method) | Valid when BZ = 4 (PGP2 Zone). Data offset starts from the $3^{rd}$ byte of 2048 data area. Hardware (H/W) will pre-fill 0 × 54 h, 0 × 44 h, 0 × 49 h from $0^{th}$ byte of 2038 data area. |
| 29–31 | 2 | TDU data (Packet Size) | Valid when BZ = 4 (PGP2 Zone). Data offset starts from the $3^{rd}$ byte of 2048 data area. Hardware (H/W) will pre-fill 0 × 54 h, 0 × 44 h, 0 × 49 h from $0^{th}$ byte of 2038 data area. |

TABLE II

Buffer Zone Table (BZ of WCS Data Descriptor)

| BZ | Description | Notation |
|---|---|---|
| 0 | Write-Buffer Area | WRBUF |
| 1 | Lead-In Area | LI |
| 2 | Lead-Out Area | LO |
| 3 | Pre1-gap Area | PGB1 |
| 4 | Pre2-gap Area | PGB2 |
| 5 | Post-gap Area | POB |
| 6 | PMA Area | PMA |
| 7 | Run-In Area | RI |
| 8 | Run-out Area | RO |

TABLE II-continued

Buffer Zone Table (BZ of WCS Data Descriptor)

| BZ | Description | Notation |
|---|---|---|
| 9 | Audio Link Area | AL |
| 10 | PCA Test Area | TOC |
| 11 | PCA Count Area | TOC |

TABLE III

Data Block Type (DataBlockType)

| Value | Description |
|---|---|
| 0 | CD-DA |
| 1 | CD-ROM |
| 2 | XA or CDI |
| 3 | RAW |

TABLE IV

Header/Subheader Source (HeaderSrc or SubHeaderSrc)

| Value ([0:3]) | Description | Note |
|---|---|---|
| 0 | Header/Subheader/Mode source in block of DRAM | Ignore Header Operation |
| 1 | Header/Subheader/Mode source in descriptor | When BZ = 7 or BZ = 9, low nibble of Mode byte should come from HeaderMode low nibble, High nibble should come from mode data in DRAM |
| 2 | Header source using previous WCS Header with Header Operation in Table V | |

TABLE V

Header Operation (HeaderOpt)

| Value | Description |
|---|---|
| 0 × 00 | No Operation |
| 0 × 01 | BCD increase after generation |
| 0 × 02 | BCD decrease after generation |
| 0 × 11 | Hex increase after generation |
| 0 × 12 | Hex decrease after generation |

TABLE VI

Encoder Operation (EncoderOpt1)

| Bit | Description |
|---|---|
| 0 | P Parity generation |
| 1 | Q parity generation |
| 2 | EDC generation |
| 3 | Zero EDC bytes |
| 4 | Zero Aux bytes |
| 5 | Sync pattern generation |
| 6 | XA Form bit check |
| 7 | Scrambling enable |

TABLE VII

TDB Data Source (TDBDataSrc)

| Value [7:4] | Description | Note |
|---|---|---|
| 0 | TDB data source in block of DRAM | Ignore TDB Data |
| 1 | TDB data source in descriptor | |

TABLE VIII

WCS Subcode Descriptor

| Offset | Size (bytes) | Item | Description |
|---|---|---|---|
| 0–3 | 4 | NoRecordBlock | No. of blocks for encoding |
| 4 | 1 | BZ | Buffer Zone # See Table II |
| 5 | 1 | SubPSrc | Subcode-P Source See Table X or XI |
| 6 | 1 | SubPOpt | Subcode-P Operation See Table XVI |
| 7 | 1 | SubPdata0 | P Data 0 |
| 8 | 1 | SubPdata1 | P Data 1 |
| 9 | 1 | Reserved | |
| 10 | 1 | Qopt | Q operation |
| 12–15 | 4 | Pdata0Block | P data0 no. of recording blocks |
| 16–19 | 4 | Pdata1Block | P data 1 no. of recording blocks |
| Qopt = 0 (Program and Lead-out) | | | |
| 20 | 1 | MCN/ISRC Opt | MCN/ISRC operation See Table XVII |
| 21 | 1 | SubQISRCSrc | SubQISRC Source See Table XII |
| 22–23 | 2 | MCNInsertBlock | No. of blocks for MCN Insertion |
| 24–25 | 2 | ISRCInsertBlock | No. of blocks for ISRC Insertion |
| 26 | 1 | ISRCEntryNo | ISRC in ISRC Entry Area of DRAM |
| 27 | 1 | SubQMCNSrc | SubQMCN Source See Table XII |
| 28 | 1 | Reserved | |
| 29 | 1 | Ctl-AdrSrc | Ctl/Adr data source See Table IX |
| 30 | 1 | Ctl-Adrdat | Clt/Adr data |
| 31 | 1 | TNOSrc | TrackNo data source See Table IX |
| 32 | 1 | TNO | TrackNo data |
| 33 | 1 | Index Src | Index/Point data source See Table IX |
| 34 | 1 | Indexdata0 | Index data0 pattern |
| 35 | 1 | Indexdata1 | Index data1 pattern |
| 36–39 | 4 | Index0Block | No. of blocks for index data 0 encoding |
| 40–43 | 4 | Index1Block | No. of blocks for Index data 1 encoding |
| 44 | 1 | Reserved | |
| 45 | 1 | QMSFSrc | QMSF source See Table IX |
| 46 | 1 | QMSFOpt | QMSF operation See Table XIII |
| 47 | 1 | StartQMin | Start Q Min |
| 48 | 1 | StartQSec | Start Q Sec |
| 49 | 1 | StartQFrame | Start Q Frame |
| 50 | 1 | QzeroOpt | Qzero Operation See Table XIX |
| 51 | 1 | QzeroSrc | Qzero Source See Table IX |
| 52 | 1 | Qzero4to7 | Qzero data [4:7] See Table IX |
| 53 | 1 | Qzero0to3 | Qzero data [0:3] See Table IX |
| 54 | 1 | QAMSFSrc | QAMSF source See Table IX |

TABLE VIII-continued

WCS Subcode Descriptor

| Offset | Size (bytes) | Item | Description |
|---|---|---|---|
| 55 | 1 | QAMSFOpt | QAMSF operation See Table XIII |
| 56 | 1 | StartQAMin | Start Q Amin |
| 57 | 1 | StartQASec | Start Q Asec |
| 58 | 1 | StartQAFrame | Start Q Aframe |
| 59 | 1 | SubRWSrc | Subcode RW data source See Table IX |
| 60 | 1 | BZRW | Buffer Zone for R–W |
| 61 | 1 | SubRWData | Subcode RW data content |
| 62–63 | 2 | StartDiskBlock Addr | Start Disk block pointer for encode. The SartDiskBlockAddr is the physical block address (2.5K bytes) which is the Start Pointer within a specified zone of the buffer. If the StartDiskBlockAddr is outside of the range defined by the Start and End Block Addr of a zone or left as 0 then the Start Block Addr of that zone is used as the default StartDiskBlockAddr. |
| | | | QOpt = 1 (Lead-in/TOC) or Qopt= 2 (PMA) |
| 20 | 1 | NoTQEntry | Define in TQ Entry. TQ Entry always starts from 0 in TOC Entry for QOpt = 1. TQ Entry always starts from 0 in PMA Entry for Qopt = 2. See Table XV |
| 21 | 1 | Repeated count for zero | Normal is 10, valid only for Qopt = 2 |
| 22 | 1 | Reserved | |
| 23 | 1 | Current TQEntry | Update by H/W in registers |
| 24 | 1 | CurrentZeroRepeated | Update by H/W in registers, valid only for Qopt = 2 |
| 25 | 1 | CurrentRepeatedCount | Upddate by H/W in registers |
| 26–43 | 18 | Reserved | |
| 44 | 1 | QMSFOpt | QMSF operation See Table XIII |
| 45 | 1 | StartQMin | Start Q Min See Table IX |
| 46 | 1 | StartQSec | Start Q Sec |
| 47 | 1 | StartQFrame | Start Q Frame |
| 48 | 1 | QzeroOpt | Reserved for DDRW |
| 49 | 1 | Qzero4to7 | Reserved for DDRW |
| 50 | 1 | Qzero0to3 | Reserved for DDRW |
| 51–58 | 8 | Reserved | |
| 59 | 1 | SubRWSRc | Subcode RW data source See Table IX |
| 60 | 1 | BZRW | Buffer Zone for Read Write |
| 61 | 1 | SubRWdata | Subcode for RW data |
| 62–63 | 2 | Reserved | |
| | | | QOpt = 3 (NOP) 96 byte No operation P, Q, R–W using DRAM data and no P–W subcode operation |
| 20–63 | 44 | NOP | 96 byte no-operation |
| | | | Qopt = 4 Q 12 byte No Operation Q using DRAM data and no Q subcode operation See Table XIV for Q 12 byte. |
| 20–58 | 39 | Reserved | |
| 59 | 1 | SubRWSrc | Subcode RW data source See Table IX |
| 60 | 1 | BZRW | Buffer Zone Read-Write |
| 61 | 1 | SubRWdata | Subcode RW data |
| 62–63 | 2 | StartDiskBlockAddr | Start Disk block pointer for encode *C |

TABLE IX

Q Subcode in 12 byte (QOpt = 4) Is this correct?

| Byte | Command |
|---|---|
| 0[4:7] | Ctrl |
| 0[0:3] | Adr |
| 1 | TNO |
| 2 | Index |
| 3 | Min |
| 4 | Sec |
| 5 | Frame |
| 6[4:7] | Hour/Zero |
| 6[0:3] | Ahour/Zero |
| 7 | Amin |
| 8 | Asec |
| 9 | Aframe |
| 10 | CRC |
| 11 | CRC |

TABLE X

TQ for TOC or PMA Definition (TOC Q/PMA Entry)

| Byte | Size | Variable | Notes |
|---|---|---|---|
| 0 | 1 | TQOpt | TQ Operation for Hardware (H/W) See Table XX |
| 1 | 1 | Entry Recording Repeat Count | Normally 3 for Lead-In Normally 5 or 10 for PMA |
| 2 | 1 | Ctrl/Adr | |
| 3 | 1 | TNO | |
| 4 | 1 | Index/Point | |
| 5 | 1 | Min | Possible updated by H/W for TOC |
| 6 | 1 | Sec | Possible updated by H/W for TOC |
| 7 | 1 | Frame | Possible updated by H/W for TOC |
| 8 | 1 | Zero | QOpt = 1 (TOC), H/W will use the field for Zero. QOpt = 2 (PMA), H/W will perform Repeat Count for Zero specified in WCS |
| 9 | 1 | Pmin | |
| 10 | 1 | Psec | |
| 11 | 1 | Pframe | |
| 12–15 | 1 | Reserved | |

TABLE XI

Data Source

| Value | Description | Note |
|---|---|---|
| 0 | Source in block of DRAM | |
| 1 | Source in descriptor | |
| 2 | Source in previous descriptor with operation in Table S3 | Only for QMSF/QAMSF |

TABLE XII

Subcode P-Date Source

| Value | Description | Note |
|---|---|---|
| 0 | Source in block of DRAM | |
| 1 | Source in descriptor | |
| 2 | Source in DRAM offset 2367 byte, most significant bit | |

TABLE XIII

Subcode P-Data Source

| Value | Description | Note |
|---|---|---|
| 0 | Source in block of DRAM | |
| 1 | Source in descriptor | |

TABLE XIV

Data Source

| Value | Description | Note |
|---|---|---|
| 0 | Reserved | |
| 1 | MCN is defined in register | Subcode Q-Mode 2 should appear as if every MCNInsertBlock frame. The first MCN will be immediately after ISRC, if ISRC existed. |
| 2 | ISRC is defined in ISRC Entry resides in DRAM | Subcode Q-Mode 3 should appear as ISRC, ISRC, RID ISRC, ISRC, TDB |

TABLE XV

MSF/A-MSF Operation

| Value | Description | Note |
|---|---|---|
| 0 × 00 | No Operation | |
| 0 × 01 | BCD increase after generation | |
| 0 × 02 | BCD decrease after generation | |
| 0 × 03 | BCD decrease up to 0:0:0 then increase | |

TABLE XVI

Subcode-P Operation

| Value | Description | Note |
|---|---|---|
| 0 | Using pdata0, pdata1 and no repeated | |
| 1 | Using pdata0, pdata1 with repeated pattern | |

TABLE XVII

ISRC/MCN Operation

| Value | Description | Note |
|---|---|---|
| 0 | No ISRC, No MCN | |
| 1 | Only ISRC required | |
| 2 | Only MCN required | Not Valid |
| 3 | Both ISRC/MCN required | |

TABLE XVIII

Subcode Q Operation

| Value | Description | Note |
|---|---|---|
| 0 | Program Area/Lead-out Recording | |
| 1 | Lead-In Recording | |
| 2 | PMA Recording | |
| 3 | No-Operation | 96 bytes No Operation P, Q, R-W using DRAM data and no P-W subcode operation |
| 4 | Q 12 byte then No Operation | Q using DRAM data and no Q subcode operation |

TABLE XIX

Qzero Operation

| Value | Description | Note |
|---|---|---|
| 0 | Using Qzero4to7, Qzero0to3 as it is | |
| 1 | Using Qzero4to7 as Hour, Qzero0to3 as Ahour | |

TABLE XX

TQ Operation

| Value | Description | Note |
|---|---|---|
| 0 | No Update Min/Sec/Frame | For TOC |
| 1 | Update Mm/Sec/Frame from WSC | For TOC |
| 2 | Update Mm/Sec/Frame/Zero from WSC | For DD TOC |
| 3 | Zero Cycle enabled | |

Appendix B

```
Volume in drive D is iMl Pattent
Volume Serial Number is 7CF6-90F6
Directory of d:\
04/30/2003    02:26 AM    <DIR>          Files4Patent
                         0 File(s)              0 bytes
Directory of d:\Files4Patent
04/30/2003    02:26 AM    <DIR>          .
04/30/2003    02:26 AM    <DIR>          ..
04/30/2003    02:18 AM              26,831 endec.h
04/30/2003    02:20 AM               9,146 mcu.h
02/11/2003    03:57 AM              89,410 seq.v
02/11/2003    03:57 AM              18,231 seqadc.v
02/11/2003    03:57 AM              24,312 seqadg.v
02/11/2003    03:57 AM              19,134 seqccl.v
02/11/2003    03:57 AM              38,996 seqcmd.v
02/11/2003    03:57 AM               2,305 seqcrc.v
02/11/2003    03:57 AM              31,718 seqecl.v
02/11/2003    03:57 AM              14,389 seqftc.v
02/11/2003    03:57 AM               9,302 seqmac.v
02/11/2003    03:57 AM             192,917 seqreg.v
02/11/2003    03:57 AM              10,074 seqrpc.v
02/11/2003    03:57 AM              47,833 seqscd.v
02/11/2003    03:57 AM             123,780 seqsgn.v
02/11/2003    03:57 AM               2,927 seqzdc.v
02/11/2003    03:57 AM               8,722 seq_dbg.v
04/30/2003    02:24 AM              58,776 test.c
              18 File(s)           728,803 bytes
Total Files Listed:
              18 File(s)           728,803 bytes
               3 Dir(s)                  0 bytes free
```

We claim:

1. An optical disk drive controller, comprising:
a host interface coupled to communicate with a host;
a disk drive interface coupled to communicate with a disk drive;
a data encoder that encodes appropriately for writing onto a media in the disk drive;
a write control sequencer coupled to control and monitor data flow between the host interface and the disk drive interface, wherein the write control sequencer monitors and controls the flow of data in accordance with instructions stored in descriptors loaded into the controller prior to the transfer of data between the host interface and the disk drive interface; and pointer registers and WCS repeat registers, wherein the pointer registers are preloaded with control pointers and the WCS repeat registers are preloaded with repeated descriptors prior to start of the WCS control sequencer.

2. An optical disk drive controller, comprising:

a host interface coupled to communicate with a host;

a disk drive interface coupled to communicate with a disk drive;

a data encoder that encodes appropriately for writing onto a media in the disk drive; and a write control sequencer coupled to control and monitor data flow between the host interface and the disk drive interface, wherein the write control sequencer monitors and controls the flow of data in accordance with instructions stored in descriptors loaded into the controller prior to the transfer of data between the host interface and the disk drive interface;

wherein descriptors loaded into the controller are stored in an external memory;

wherein the write control sequencer retrieves descriptors from a WCS repeat register.

3. A method of writing data to an optical drive, comprising:

loading descriptors into a controller;

loading registers on the controller;

fetching descriptors previously loaded into the controller; and sending commands to monitor and control data flow through the controller;

wherein loading registers on the controller includes loading descriptors into repeat registers and loading pointers into pointer registers.

4. The controller of claim 1, wherein the descriptors includes a data descriptor and a subcode descriptor.

5. The controller of claim 1, wherein the descriptors are loaded into the controller by a microprocessor executing firmware instructions.

6. The controller of claim 5, wherein the microprocessor is embedded in the controller.

7. The controller of claim 1, wherein the write control sequencer provides signals to an error code generator.

8. The controller of claim 1, wherein the write control sequencer provides signals to a scrambler.

9. The controller of claim 1, wherein the write control sequencer provides signals regarding which descriptor to be executed next.

10. The controller of claim 1, wherein the descriptors loaded into the controller are stored in an external memory.

11. The controller of claim 2, wherein the descriptors includes a data descriptor and a subcode descriptor.

12. The controller of claim 2, wherein the descriptors are loaded into the controller by a microprocessor executing firmware instructions.

13. The controller of claim 12, wherein the microprocessor is embedded in the controller.

14. The controller of claim 2, wherein the write control sequencer provides signals to an error code generator.

15. The controller of claim 2, wherein the write control sequencer provides signals to a scrambler.

16. The controller of claim 2, wherein the write control sequencer provides signals regarding which descriptor to be executed next.

17. The method of claim 3, wherein loading descriptors into the controller includes executing firmware instructions to create descriptors; and transferring the descriptors to an external memory.

18. The method of claim 3, wherein fetching descriptors previously loaded into the controller includes determining whether a next descriptor to be executed is in an external memory or in a repeat register;

loading the next descriptor from the external memory or the repeat register.

19. The method of claim 18, wherein loading the next descriptor includes loading the next descriptor into an available buffer location in a write control sequencer.

* * * * *